United States Patent [19]

Kotzin

[11] 4,384,629
[45] May 24, 1983

[54] WEIGHING DEVICE

[76] Inventor: Bernard Kotzin, 510 Anderson St., Manhattan Beach, Calif. 90266

[21] Appl. No.: 257,927

[22] Filed: Apr. 27, 1981

[51] Int. Cl.³ .......................... G01G 1/02; G01G 1/18
[52] U.S. Cl. ..................................... 177/224; 177/236; 177/251
[58] Field of Search ............... 177/216, 224, 251, 246, 177/236

[56] References Cited

U.S. PATENT DOCUMENTS

| 1,185,634 | 6/1916 | Cummer | 177/236 |
| 2,383,408 | 8/1945 | Morgan | 177/236 |
| 2,413,166 | 12/1946 | Bowman | 177/224 X |
| 2,476,399 | 7/1949 | Benjamin | 177/236 |

FOREIGN PATENT DOCUMENTS 234935 6/1925 United Kingdom ............... 177/236

*Primary Examiner*—George H. Miller, Jr.
*Attorney, Agent, or Firm*—Edward D. O'Brian; K. H. Boswell

[57] ABSTRACT

A simple, inexpensive weighing device having only one part which moves relative to the remainder of the device can be constructed utilizing a body shaped so that it will rock relative to a supporting surface when an object is placed in a holder forming a part of the body. A pendulum type pointer is pivotally mounted on the body so that the approximate weight of the object can be determined by visual inspection of the position of the pointer relative to appropriate indicia on the body. The body is shaped so that the amount that it will rotate when an object is placed upon a holder is limited to such an extent that the horizontal distance between the object and the center of rotation of the pendulum does not change significantly so as to achieve a desired degree of accuracy in the weight indicated by the position of the pendulum.

4 Claims, 3 Drawing Figures

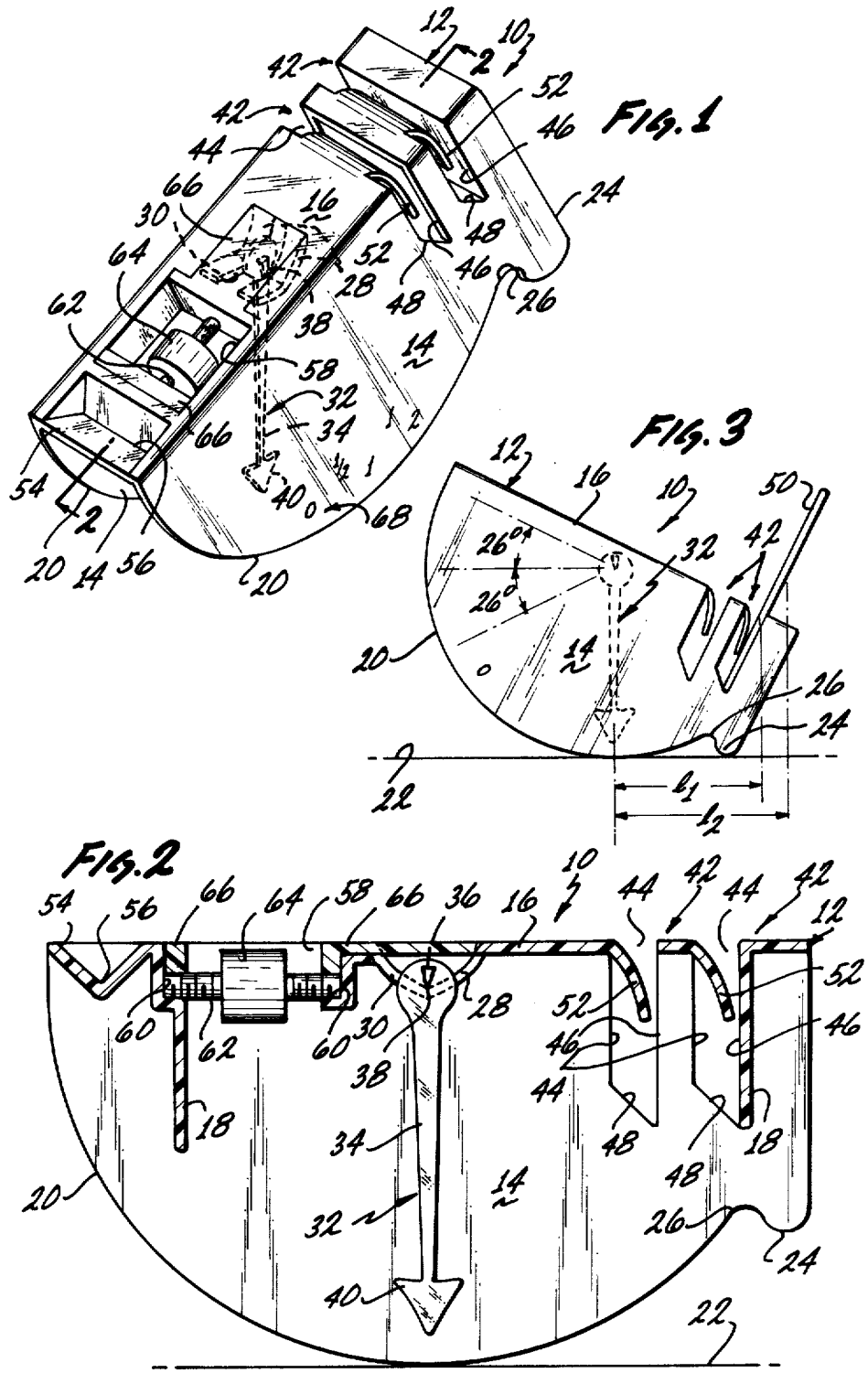

WEIGHING DEVICE

BACKGROUND OF THE INVENTION

The invention set forth in this specification pertains to a new and improved weighing device.

It is, of course, a matter of common knowledge that a wide variety of different mechanical, hydraulic and electronic weighing devices are both well known and widely used. In spite of the fact that there are extremely large numbers of different known weighing devices and in spite of the fact that various types of weighing devices have been known since virtually the advent of civilization, it is considered that there is still a need for weighing devices which are specifically adapted to be used for various different specialized tasks. It is considered that this need is frequently combined with a need for devices specifically adapted for or specific usages which are relatively inexpensive as compared to prior devices for use in performing the same type of operation or task.

It is believed that this can be easily illustrated by referring to weighing devices which are primarily intended to be utilized in weighing common envelopes of a type normally sent through the postal systems of the world. Most common postal scales as are used for weighing envelopes and the like are moderately expensive devices constructed so as to be capable of withstanding a significant amount of physical abuse. In spite of the manner in which these prior devices have been constructed they frequently have not been particularly accurate and frequently have indicated weights which are significantly different from actual weights of objects.

Because of their costs, many types of postal scales are not often utilized in home type environments. Efforts have been made to provide a number of different scales or weighing devices for use in such environments. Some of such prior devices have been constructed in such a manner as to be relatively incapable of withstanding the normal handling and abuse accorded a weighing device in the home. Other of such prior home devices have tended to be of such a character as to be relatively undesirable for use as a result of their complexity or manner of operation.

As a result of these factors, it is considered that there is a distinct need for new and improved weighing devices: which are specifically adapted for use in weighing envelopes and the like; which are sufficiently inexpensive that they can be utilized in homes and in offices where postal scales are not normally used; and which are reasonably accurate.

SUMMARY OF THE INVENTION

A broad objective of the present invention is to provide such new and improved weighing devices. More specifically, the invention is intended to provide weighing devices which: may be easily and conveniently manufactured at a comparatively nominal cost; which are sufficiently simple so that there is substantially no chance of these weighing devices failing to operate in their intended utilization; which are of such a character as to be capable of withstanding a significant amount of physical abuse; and which are of a sufficient degree of accuracy for practical purposes even though they may not be completely accurate in an absolute sense.

In accordance with this invention these various objectives are achieved by providing a weighing device which includes a body, the lower part of said body being arcuately shaped so that said body is capable of rocking relative to a support surface, pendulum means mounted on said body above said lower part of said body, a holder on said body for an object to be weighed, said holder being located in a position such that when an object is located in said holder said body will rock relative to said support surface in an amount in accordance with the weight of said object, indicia located on said body to indicate by reference to the position of said pendulum means relative to said body the approximate weight of an object in said holder in which the improvement comprises: said body being constructed so that said body can only rock relative to said supporting surface in moving from an initial position in which nothing is held by said holder to an at rest position with an object held in said holder to an extent such that said pendulum means moves through an arc relative to said body which is sufficiently limited so that the distance between said holder and the center of rotation of said pendulum means does not vary to such an extent that the weight indicated by the position of said pendulum means relative to said body does not exceed an intended deviation from the actual weight of said object, and such that as said body moves between said positions the horizontal projection of the distance between said holder and said center of rotation increases and then decreases as subsequently described in this specification.

BRIEF DESCRIPTION OF THE DRAWING

Because of the nature of this invention it is best explained with reference to the accompanying drawing in which:

FIG. 1 illustrates a presently preferred embodiment or form of a weighing device in the present invention;

FIG. 2 is a cross-sectional view taken at line 2—2 of FIG. 1 in which a pendulum pointer is shown in elevation; and FIG. 3 is a diagramatic, side elevational view of a weighing device as shown in the preceding figures in which distances are illustrated for explanatory purposes.

Those skilled in the art of weighing devices will realize that the principals or concepts of the present invention as are defined in the dependent claims forming a part of this specification and which are utilized in the precise weighing device illustrated can be easily employed in a variety of other differently appearing weighing devices through the use or exercise of routine engineering skill or ability. For this reason, the present invention is not to be considered as being limited to a weighing device having the precise appearance of the weighing device illustrated.

DETAILED DESCRIPTION

In the drawing there is shown a weighing device 10 which is constructed so as to include a body 12 formed as a single unitary member out of an appropriate soft supporting polymeric material of a somewhat resilient character such as, for example, high impacting styrene. As will be subsequently apparent, the material used in forming the body 12 in the preferred device 10 should be transparent or extremely translucent in character so that an object may be viewed through the material used in the body 12.

This body 12 is shaped so as to include two identically shaped sides 14 connected by a top 16 and several internal walls 18. These sides 14 are parallel to one another and are spaced from one another a sufficient distance so that the entire device 10 will remain in an upright position when arcuate lower edges 20 on the sides 14 are located upon a horizontally extending supporting surface 22 such as, for example, a conventional desk top. These sides 14 include identical stop like projections 24 located generally adjacent to ends 26 of the edges 20. These projections 24 are located so that they will serve to limit the amount that the body 12 will rock on the surface 22 along the edges 20.

Within the top 16 of the body 12 there are located two aligned depressions 28 of a downwardly directed substantially "V" type shape. These depressions 28 are located so that a line extending through their bottoms (not separately numbered) will extend perpendicular to the sides 14. These depressions 28 are also located so that each of the depressions 28 is equidistant from its closest adjacent side 14. A small slot 30 is formed in the top 16 between the two depressions 28.

In the device 10 the sole moving part of the device—a pointer 32 serving as a pendulum—is located so that its shank 34 extends through the slot 30. This shank 34 carries outwardly extending, knife edge type projections 36 having downwardly directed knife like edges 38 engaging the depressions 28 in such a manner that the entire pointer 32 may rock back and forth relative to the body 12 in an amount at least corresponding to the maximum amount that the body 12 may rock along the arcuate edges 20 relative to the supporting surface 22. This construction is such that the pointer 32 can only rock back and forth in a plane which is parallel to and midway between the sides 14 of the body 12.

During such movement, the pointer 32 will pivot about an axis (not designated) which for practical purposes can be taken as being coincident with the lower most edges 38 on the projections 36. Preferably, the projections 36 and the shank 34 should contain significantly less material than is present in an enlarged arrowhead type pointer 40 on this shank 34 generally remote from the top 16. It is noted that the depressions 28 are located relative to the arcuate edges 20 so that the lower edges 38 are located at the centers of the arcs represented by these lower edges 20. As a result of this, at no time will the pointer 40 extend outwardly from between the sides 14.

The body 12 also preferably includes at least one and preferably two identically shaped holders 42. Each of these holders includes a notch like opening 44 in the top 16 and in the sides 14 which has back edges 46. These back edges 46 of the holders 42 are located so as to extend in flat planes (not illustrated or numbered) which are perpendicular to the sides 14. These planes are, of course, perpendicular to the axis of rotation of the pointer 34 described in the preceding. Preferably, each of the holders 42 includes sloping bottom edges 48 leading generally towards the back edges 46. This is intended to facilitate an envelope, card or the like 50 being inserted in the holders 42 so that they will be automatically positioned so as to extend generally in planes immediately adjacent to and parallel to the imaginary planes (not designated) within which the back edges 46 are located. Preferably, the holders 42 also include curved tabs 52 extending from the top 14 which have sufficient resiliency so as to be capable of holding an envelope or a card in a position as described.

The body 12 also preferably includes a small V-shaped depression or pocket 54 located remote from the holders 42. The bottom edge 56 of this depression 54 preferably extends perpendicular to the sides 14 so that any weight placed within this depression 54 will be concentrated immediately over this bottom edge 56 and will not shift during the normal use of the device 10. Also, preferably the top 16 includes an enlarged opening 58 adjacent to the depression 54 generally between this depression 54 and the depressions 28.

Other depressions 60 reasonably corresponding to the depressions 28 are located along the opening 58 adjacent to the depression 54 and adjacent to the depressions 48. These depressions 60 are aligned and are located midway between the sides 14. They are adapted to hold an elongated threaded shaft 62 upon which there is mounted an internally threaded member 64 such as an internally threaded cylinder. Preferably but not necessarily the depressions 28 and 60 are closed off through the use of retainers 66 secured to the top 16 in any convenient manner such as, for example, by ultrasonic welding so as to hold the shaft 62 and the projections 36 in place.

It is believed that the manner of use of the device 10 will be reasonably apparent from a consideration of the proceeding. When the device 10 is to be used it will normally be located upon a surface such as the surface 22 and the position of the member 64 will be adjusted until such time as the top 16 extends upwardly at an angle and until such time as the pointer 40 swings to a position in which the pointer designates a zero marking forming a part of a series of indicia 68 on a side 14. Preferably, corresponding series of indicia 68 are present on both of the sides 14. It will be apparent from FIG. 1 that on each of the sides 14 there are two different series of indicia 68; each of these series corresponds to one of the holders 42.

At this point, an evelope, card or the like 50 may be inserted into a holder 42. Because of the action of the bottom edges 48 and the tab 52 associated with such a holder 42 the card or envelope 50 will be held against the back edges 46 associated with the holder 42. This will create an unbalanced situation which will tend to cause the device 10 to rock so as to move the projections 24 generally towards the surface 22.

The amount that the body 12 will rock will, of course, be dependent upon the weight of the card or envelope 50. As the body 12 rocks in this manner, gravity will tend to hold the pointer 32 in a vertical orientation. As a consequence of this, an indication of the weight of the card or envelope 50 may be determined by inspecting the device 10 for the position of the pointer 40 relative to various specific indicia 68 by viewing through the sides 14.

The amount that the device 10 will rock when it is used in this manner will, of course, depend upon the degree of unbalance created by the insertion of a card or envelope 50 within a holder 42. In order to obtain as accurate a weight indication as reasonably possible, it will be normally preferred to use the specific holder 42 which is furthest from the axis of rotation of the pointer 32. This, of course, involves the well known equation relative to the movement of a lever about a pivot point. The one of the series of indicia 68 illustrated in FIG. 1 corresponding to the specific holder 42 used will, of course, be employed in determining the weight of the object.

An important consideration relative to the device 10 relates to the fact that it is constructed so that the number of degrees of movement or rotation of the pointer 32 relative to the body 12 is limited in order to minimize any change in the moment arm created by the presence of a card or envelope 50 which will tend to cause rocking of the body 12. This is important in achieving a reasonable degree of accuracy which is acceptable for most purposes in connection with the use of the device 10 for weighing purposes.

This consideration is indicated by the diagramatic FIG. 3 of the drawing. In this FIG. 3 the device 10 is indicated as having been rotated to the maximum amount possible because of the projections 24 due to the weight of a card or envelope 50. From an examination of this FIG. 3 it will be seen that the particular device 10 shown is constructed so that it can only rock through a comparatively limited arc of about 52°. This angle is determined by the initial setting of the member 64 and by the projections 24. The latter serve as stops or stop means limiting the rocking action possible. It is noted that this rocking action involves movement of the top 16 through a horizontal position in order to minimize the change in the noted moment arm. Such movement involves the holders 42 moving so that the horizontal projection of the distances of such holders from the center of rotation of the pointer 32 increases and then decreases as an object is weighed. Such limited movement will provide about a 10% variation in the length of the moment arm relative to the axis of rotation of the pointer 32 created by the presence of a card or envelope 50. This is indicated by the two lengths $L_1$ and $L_2$ indicated in FIG. 3.

The length $L_1$ corresponds to a geometric projection on the horizontal of the distance between the edges 38 on the pointer 32 and the card or envelope 50 taken along an imaginary line perpendicular to the card or envelope 50. The length $L_2$, of course, corresponds to the length of such an imaginary line and represents the position of the card or envelope 50 as such an imaginary line rotates through a horizontal position during the use of the device 10.

This particular angle of 52° has been selected because it is believed that an error of about 10% in a weight measurement is reasonably acceptable for most postage purposes. If deired, the indicia 60 may be located on the sides 14 in such an orientation that the device 10 will always give an indication of weight which is at least the weight of the card or envelope 50 being weighed or greater. It is considered that it is a matter of choice as to whether or not the device 10 should be constructed in this manner so as to always tend to overweight or should be constructed as previously indicated so as to tend to average out any tendency to over or under weigh.

In the event it is desired to weigh something with this device 10 having a weight which is greater than can normally be accommodated in this device 10, it is possible to insert a counterweight (not shown) into the depression or pocket 54. The use of such a counterweight is in accordance with conventional practice in double pan balances and the like. The use of such a counterweight is, of course, desirable in that it tends to expand the utility of the device 10. It should not be assumed, however, that this device 10 has the utility or the accuracy of many common scales such as are used for postal purposes for weighing cards, envelopes, packages and the like.

The particular device 10 is considered to be especially desirable because of the simplicity of the device. The entire body 12 other than the retainers 66 can be formed by common ejection molding techniques utilizing straight pull dies which do not have slides, cores or the like. The remaining parts—the pointer 32 and the retainers 66—may be easily manufactured using such dies. Because of the construction employed, this device 10 may be easily and conveniently assembled.

Because the pointer 32 is located generally within this device 10, there is very little danger of this pointer 32 becoming damaged either during shipment or use of the device 10. This factor is considered to be particularly important in enabling the device 10 to be shipped in a flat sided box which does not require specialized "packing" to avoid the pointer 32 either damaging the box or being damaged.

I claim:

1. A weighing device which includes a body, the lower part of said body being arcuately shaped so that said body is capable of rocking relative to a support surface, pendulum means mounted on said body above said lower part of said body, a holder on said body for an object to be weighed, said holder being located in a position such that when an object is located in said holder said body will rock relative to said support surface in an amount in accordance with the weight of said object, indicia located on said body to indicate by reference to the position of said pendulum means relative to said body the approximate weight of an object in said holder in which the improvement comprises:

said body being constructed so that said body can only rock relative to said supporting surface in moving from an initial position in which nothing is held by said holder to an at rest position with an object held in said holder to an extent such that said pendulum means moves through an arc relative to said body which is sufficiently limited so that the distance between said holder and the center of rotation of said pendulum means does not vary to such an extent that the weight indicated by the position of said pendulum means relative to said body does not exceed an intended deviation from the actual weight of said object and such that as said body moves between said positions the horizontal projection of the distance between said holder and said center of rotation increases and then decreases, said lower part of said body when viewed in side elevation has the shape of an arc of a circle, said lower part of said body includes stop means for limiting the amount that said body can rock on said support surface to such an extent that said pendulum means in moving from its position when nothing is held by said holder to an at rest position with an object held in said holder moves through an arc of no more than about 52°.

2. A weighing device as claimed in claim 1 wherein:
   p1 there are two of said holders located at different distances from said center of rotation, each of said holders comprises notch means adapted to hold a generally flat object so that said object extends perpendicular to an imaginary line drawn from the axis of rotation of said pendulum means, said line passing through the horizontal as said body rocks after an object is placed in said holder and a clip means for holding said object within said notch means in such a position, said body includes two spaced parallel sides and means connecting said sides so as to hold them relative to one another, each of said sides having an arcuate lower edge, said pendulum is a pointer pivotally mounted on said body between said sides, said body being sufficiently transparent so that the position of said pointer can be determined by viewing said pointer through one of said sides, said indicia being located on said body so as to be visible when said pointer is viewed through one of said sides, adjustable tare means for adjusting the weight distribution of said body relative to said support surface, pocket means for holding a counterweight between said sides.

3. A weighing device as claimed in claim 1 wherein:

said holder comprises notch means adapted to hold a generally flat object so that said object extends perpendicular to an imaginary line drawn from the axis of rotation of said pendulum means, said line passing through the horizontal as said body rocks after an object is placed in said holder.

4. A weighing device as claimed in claims 1 or 3 wherein:

said body includes two spaced parallel sides and means connecting said sides so as to hold them relative to one another, each of said sides having an arcuate lower edge, said pendulum is a pointer pivotally mounted on said body between said sides, said body being sufficiently transparent so that the position of said pointer can be determined by viewing said pointer through one of said sides, said indicia being located on said body so as to be visible when said pointer is viewed through one of said sides.

* * * * *